Oct. 16, 1962   R. W. GAINES ET AL   3,058,863
POLYETHYLENE STRUCTURES
Original Filed April 4, 1956
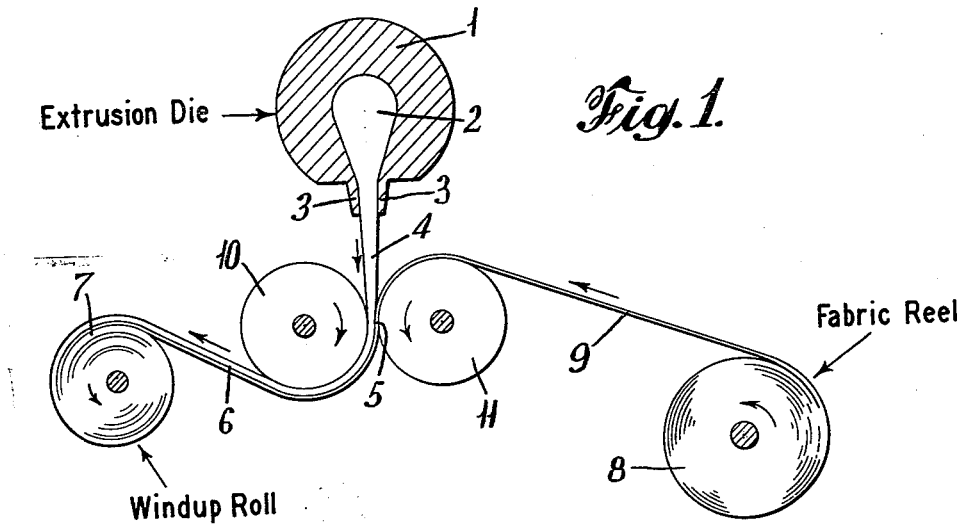
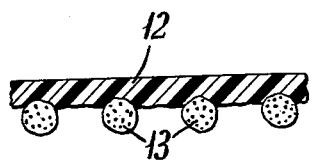 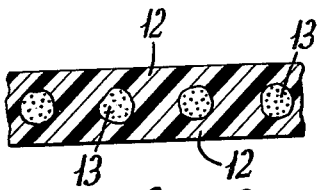 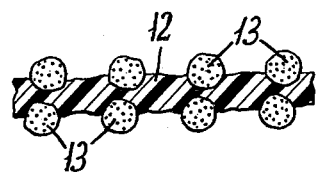
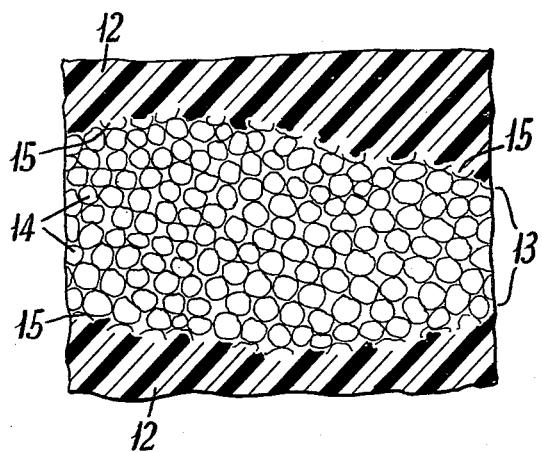
INVENTORS
ROBERT W. GAINES
HAROLD A. ARBIT
BY
ATTORNEY

United States Patent Office 3,058,863
Patented Oct. 16, 1962

3,058,863
POLYETHYLENE STRUCTURES
Robert W. Gaines, Darien, Conn., and Harold A. Arbit, Plainfield, N.J., assignors to Union Carbide Corporation, a corporation of New York
Original application Apr. 4, 1956, Ser. No. 576,029. Divided and this application May 8, 1959, Ser. No. 812,068
4 Claims. (Cl. 154—50)

This invention relates to novel polyethylene film-coated fabrics. More particularly, it pertains to polyethylene film-coated polyalkylene fiber fabrics. This application is a divisional of an application entitled "Polyethylene Structures," Serial No. 576,029, filed April 4, 1956, now abandoned.

Polyethylene film has found wide use as a packaging and protective coating material because of its desirable physical and chemical properties. It is chemically inert to most compounds; it is tasteless; it is non-toxic; it has a very low moisture-vapor permeability; it is tough; it is heat-sealable, and it remains flexible even at low temperatures. A distinct disadvantage associated with polyethylene in film form, however, is the ease with which a tear propagates once it has been started, as by a nick or puncture. For these reasons polyethylene film has been restricted to relatively light duty packaging uses only.

The preparation of polyethylene packaging materials for heavy duty purposes, for example, the packaging of materials having sharp edges such as tools, has not heretofore been entirely successful. These attempts have involved the bonding of polyethylene film to a fibrous backing, such as cotton cloth or paper, and have not been successful because of the relatively poor bonding properties of polyethylene to such reinforcements. Other disadvantages inherent in such composite structures are that since the fibrous material is not moisture-resistant, it tends to rot, and in addition is subject to mildew attack. In order to overcome these deficiencies and use polyethylene in heavy duty applications, heavier polyethylene films have been prepared. However, the improvement in tear strength is then a result of the increased weight of the film rather than from the fibrous backing material.

It has now been found that the aforementioned deficiencies are substantially overcome by laminating polyethylene film to a fabric comprising essentially polyalkylene fibers, as for example polyethylene or polypropylene fibers, under conditions of heat and pressure effecting a bond between the fabric and film, but yet preserving the fibrous structure of the fabric. Normally synthetic resin fibers are produced by extruding and stretching the molten resin through spinnerets into fine filaments which are then plied into strands. Such laminates are suitable for heavy duty uses, and in addition posses all of the desirable properties of polyethylene film itself. They are resistant to rot and mildew, inert, non-toxic and structurally strong.

Such a composite laminate of polyethylene film and polyalkylene fiber fabric can be conveniently prepared by hot-extruding a thin polyethylene film, and then while said film is still in a heat-softened state, bringing it into pressure contact with a polyalkylene fiber fabric, such as a woven or knitted fabric, a mat, a felt, a web, or a series of parallel fibers, while exerting sufficient pressure to insure intimate contact and simultaneously cooling the laminate. The laminated structure of this invention can also be prepared by heating a pre-formed polyethylene film to about its softening point while said film has pressed against it a polyalkylene fiber fabric.

The extrusion of molten polyethylene into a thin film is well known, and can be carried out by the bubble blowing method as described in U.S. Letters Patent 2,641,022, or by the flat-film die method as described in U.S. Letters Patent 2,698,463. In our invention a modification of the flat-film die method is generally preferred, since this method lends itself more readily to the preparation of the laminated structures herein disclosed.

Referring to the drawings:

FIG. 1 is a schematic cross-sectional view of an apparatus which can be used in the practice of this invention;

FIG. 2 is a schematic cross-sectional view of a two-ply polyethylene structure that can be produced by this invention using the apparatus of FIG. 1;

FIGS. 3 and 4 are schematic cross-sectional views of three-ply polyethylene structures that can be produced by this invention; and FIG. 5 is a schematic sketch of a portion of a photomicrograph of a cross-section of a polyethylene film-polyethylene fabric structure obtained by this invention.

The polyethylene film is preferably extruded from a normally solid polyethylene having a density at 23° C. of at least about 0.91, and preferably from about 0.91 to about 0.94. The density is determined in a manner similar to that described in ASTM D–17–27.

The polyalkylene fibers in the fabric ply can be either polyethylene fibers or polypropylene fibers. The polyethylene fibers are prepared from a normally solid polyethylene having a density of at least about 0.92 at 23° C., preferably from about 0.93 to about 0.98, and a melt index of from about 0.5 to about 20. The melt index is determined in a manner similar to that described in ASTM D–1238–52T. The polypropylene fibers are prepared from a normally solid polypropylene having a density at 23° C. of at least about 0.91. The weight of the polyalkylene fibers fabric ply can vary from a low value of about 0.05 ounce per square yard, as for example in wide mesh nets or parallel yarns, to any upper limit desired depending on the use to which the laminated structure is intended. For ordinary purposes a fabric weight of from about 0.2 to about 20 ounces per square yard is preferred.

Although the invention is useful for preparing laminates of polyethylene film with a polyethylene or polypropylene fiber fabric, or mixtures of said fibers, it will be more particularly described in connection with the preparation of polyethylene film-polyethylene fibre fabric laminates. In this application, the polyethylene film is extruded at a resin temperature at the die-lip of the extruder of at least about 160° C.; such temperature is required in order to insure the formation of a continuous film. The temperature of the polyethylene as it emerges through the die lip must, however, be maintained below the degradation temperature of the resin. A temperature range for extruding polyethylene of from about 175° C. to about 250° C. is generally preferred. As the film is extruded it can be used as extruded or it can be stretched to form a thinner film. A film thickness of from about 1 to about 20 mils is generally preferred, preferably from about 1 to about 10 mils. However, polyethylene film thicker than about 20 mils can be used where substantially rigid structures are desired.

The temperature of the polyethylene film as it emerges from the die-lip is one of the most critical variables, and must be carefully controlled. The temperature to be used is dependent on the film thickness desired; the weight, thickness and construction characteristics of the polyalkylene fiber fabric used; the lineal speed at which the film coating is applied to the fabric; the softening point of both the film resin and the fiber resin; and the physical properties of the fibers, in particular the strain release temperature of the polyalkylene fibers. By strain release temperature is meant that temperature at which the stretched fibers will relax and return to their original extruded unstretched dimensions. Careful temperature control is essential to assure that proper adhesion results, and that the polyethylene fibers are not degraded nor that the individual filaments thereof excessively fuse as the fiber strand comes into contact with the heat-softened film. The extrusion temperature selected must be such that there will be no thermal degradation of either film or fiber, or excessive fusion of the individual filaments in the fiber strands to each other or to the film. A temperature of from about 175° C. to about 250° C. is generally preferred, with the lower temperatures recommended where a thin light-weight fabric is employed, such as a mesh or fabric having a fabric weight of less than about 2 ounces per square yard; and the higher temperatures are preferred where a fabric having a weight greater than about 2 ounces per square yard is employed. These temperatures, it must be remembered, are also affected by the speed at which the equipment is operated. Thus, the faster the film coating operation, the higher the temperature that can be used since the fibers are in contact with hot film for a shorter period of time. For instance, temperatures of about 250° C. were found satisfactory for relatively high lineal speeds.

The lineal speed at which this invention can be conducted is also dependent on the equipment used. In this disclosure the speed was varied from about 18 to about 40 feet per minute only because of equipment limitations. It would be equally possible to carry out this invention at the speeds normally encountered in large scale production facilities, which today are operated at speeds of from about 100 to about 300 lineal feet per minute or higher.

Referring now to FIG. 1, polyethylene 2 is hot extruded from an extrusion die 1 as a continuous sheet 4 through the die orifice 3. The film 4 is stretched and while still in a heat-softened state it is brought into pressure contact with a fibrous polyalkylene fabric (polyethylene or polypropylene fibers) 9 between the nip 5 of the two rolls 10 and 11 where the fabric 9 and the film 4 are pressed together and simultaneously cooled as they pass through the nip 5. Roll 10, making direct contact with the polyethylene film 4 rotates on a fixed axis, is water cooled and has a metal surface, which may be polished, or matted, or engraved; the other roll 11, which is pressure actuated by means not here indicated, can be of any construction; generally a rubber-like surface is preferred, but if desired, it can be identical in construction to roll 10, and also contain a coolant. The laminating rolls 10, 11 are maintained at about 20° C. to about 80° C. in order to sufficiently cool the multi-ply structure 6 so that it can be wound for storage on roll 7 without danger of sticking together, and also to remove excess heat before the polyalkylene fibers can be injured. At the same time sufficient pressure is exerted by rolls 10, 11 at the nip 5 on the fabric 9 and the film 4 so that intimate contact is achieved without destroying the fibrous structure of the fabric 9. Commercially, pressures up to about 100 pounds per lineal inch have been employed between the rolls 10, 11. The fibrous polyalkylene fabric 9 is supplied from a feed roll 8.

In FIGS. 2, 3 and 4 are schematically illustrated cross-sectional views of simple multi-ply structures of this invention, showing the polyethylene film 12 and the fibrous polyalkylene fabric 13. FIG. 2 shows a two-ply laminate consisting of a layer of film 12 and a layer of fabric 13. FIG. 3 illustrates a three-ply structure consisting of a layer of film 12 on each side of a layer of fabric 13. FIG. 4 illustrates a three-ply structure produced by laminating a layer of fabric 13 on each side of a layer of film 12.

FIG. 5 is a greatly enlarged view of FIG. 3, showing the substantial preservation of the fibrous polyalkylene fabric 13, and also that the polyethylene film 12 does not appreciably impregnate the spaces between the filaments. This results in a stronger and more flexible product. Limited random fusion of the outer filaments in the fabric 13 to the polyethylene film is shown at points 15.

The laminated structures of this invention can also be prepared by placing plys of pre-formed polyethylene film and polyalkylene fiber fabrics in alternating order between heated plates, which are then maintained under pressure until bonding has occurred. Care must be taken that the temperature is not so high that the fabric loses its identity. Because of the difference in melting points it is possible to work at higher temperatures with polypropylene fabrics than is possible with polyethylene fabrics.

Using the methods disclosed in this invention it is possible to prepare multi-ply polyethylene film-polyalkylene fiber laminates having at least one ply of film and one ply of fiber material. Thus one can form a simple two-ply structure in one step, or a complex multi-ply structure by carrying out the process in one or more steps. For example, a three-ply structure can be prepared by sandwiching a polyethylene film between two plies of polyalkylene fabric, or by sandwiching a fabric ply between two plies of film, either in a one-step or in a two-step process. In like manner a multiplicity of plies can be built up by alternating a layer of film with a layer of fabric.

The multi-ply laminated structures of this invention have in composite form the structural advantages of both the fibrous fabric and the polyethylene film. Thus the laminate has an increased tear resistance due to the fabric, which is one of the film's deficiencies; and it is substantially nonpermeable to gases and moisture because of the film ply, a property which the fabric itself does not possess.

By selecting a polyalkylene fabric whose fibers have been stretched and oriented during the spinning so that this stretch can be relaxed on heating on the fibers returned to their original unstretched length one can prepare a laminated structure which will shrink biaxially when subjected to a hot liquid bath at about 100° C. Such products are of great interest in the shrink packaging field, in addition to the other uses in construction, packaging and protection fields. In the shrink packaging application the article to be packaged, for example, foodstuffs such as dressed poultry, is inserted in a plastic bag, air is then evacuated, the bag sealed, and it is then shrunk to make a snug contact with the article by immersion for a short period of time in a hot liquid bath at about 100° C. Heretofore a plasticized vinylidene chloride-vinyl chloride copolymer film has been favored because of its satisfactory heat shrinking properties. However, it has little strength at freezer temperatures, and is more expensive than polyethylene film. Conventional extruded polyethylene film, though it maintains its strength at freezer temperatures, has not been satisfactory because it shrinks in the machine direction, and stretches in the transverse direction when heated in a hot liquid bath. The product of our invention on the other hand shows biaxial shrinkage properties, and the extent of this shrinkage can be varied by varying the amount of stretch given to the filaments during spinning.

The structure of this invention can be prepared using polyethylene or polypropylene resins free from additives, or one can use resin which has been compounded with lubricants, anti-oxidants, pigments such as carbon black or other organic and inorganic pigmenting materials, or other additives commonly and normally added to such resins.

The following examples further illustrate the invention:

*Example 1*

A 24 inch end-fed flat-film die was attached to a Davis Standard 2.5 inch extruder having a metering type screw. Polyethylene, having an average molecular weight of about 20,000, a density at 23° C. of about 0.92, a melt index of about 2 and containing about 0.01% by weight of 2,6-di-tert.-butyl-p-cresol as oxidation inhibitor, was fed into the extruder and softened by heating. The resin was extruded through a 20 mil die opening at a resin temperature as it emerged from the die of 187° C. and at an extrusion rate of about 63 pounds per hour. After coming out of the die the 20 mil film was stretched over a 3.5 inch distance to a final average thickness of about 3.75 mils as it entered the nip of rolls 10, 11. The stretched film, while still in a heat-softened state, was brought into contact with a 0.5 inch mesh polyethylene fiber three-end leno fabric made from 225/50 yarns having a fabric weight of 0.38 ounce per square yard, which was moving at a linear speed of 31 feet per minute. The fabric and the film were immediately squeezed between two rolls at a nip perssure of about 55 pounds per lineal inch to assure intimate contact to form the laminated structure 6. Roll 10 was a water-cooled polished metal roll maintained at 40 to 50° C. and the other roll 11 was a hard rubber surfaced roll used to apply the pressure. As the two plies were pressed together there was a simultaneous bonding and cooling effect, and the resultant multi-ply polyethylene structure was readily wrapped into a roll 7 without sticking as it came out of the nip rolls. The finished film-fiber product had a gross weight of 2.73 ounces per square yard. The fibers of the polyethylene mesh cloth were substantially unchanged in appearance, and could not be deliminated from the film without rupturing the individual filaments thereof.

*Example 2*

Using the same apparatus, extrusion rate, temperature and polyethylene as described in Example 1, a film having an average thickness of about 4 mils was placed on a broadcloth-like polyethylene fiber cloth made from 225/50 yarns and having a fabric weight of 2.3 ounces per square yard, while the cloth was moving at a linear speed of 31 feet per minute. The finished film-fiber structure had a gross weight of 5.1 ounces per square yard. The polyethylene fiber cloth and film were firmly adhered together, a force of 1,294 grams per inch of width being required to effect delamination.

*Example 3*

Using the same apparatus and polyethylene described in Example 1, but extruding at a resin temperature as it emerged from the die of 220° C. and at a rate of about 79 pounds per hour, a film having an average thickness of about 4 mils was placed on a polyethylene fiber duck fabric made from 450/100 yarns, and having a fabric weight of about 5.2 ounces per square yard while the fabric was moving at a linear speed of 40 feet per minute. The finished film-fiber structure had a gross weight of 8.2 ounces per square yard. The fabric could not be stripped off the film without rupturing the filaments.

*Example 4*

Using the same apparatus, polyethylene, extrusion rate and temperature as described in Example 3, a film having an average thickness of about 4.25 mils was placed on a burlap-type polyethylene fiber cloth made from 1800/400 yarns and having a fabric weight of 6.42 ounces per square yard while the cloth was moving at a linear speed of about 40 feet per minute. The finished film-fiber structure had a gross weight of 10.04 ounces per square yard. The fabric could not be stripped off the film without rupturing the filaments.

*Example 5*

Using the same apparatus and polyethylene resin as described in Example 1, and extruding at a resin temperature of 248° C. as the resin emerged from the die and at a rate of about 63 pounds per hour, a film having an average thickness of from about 3 to about 4 mils was placed on a 0.5 inch mesh polyethylene fiber three-end leno fabric made from 225/50 yarns and having a fabric weight of 0.38 ounce per square yard, which was supported on a 1.5 mil pre-formed polyethylene film. The fabric and 1.5 mil film support were moving at a linear speed of about 18 feet per minute as the sandwich type laminated structure was produced.

*Example 6*

A mat of polypropylene fibers spun from polyproplylene having a melt index of about 2.9 was placed between two sheets of 4 mil polyethylene film. The film was prepared from resin having a density at 23° C. of about 0.92 and a melt index of about 2. This laminate was then placed between two aluminum plates, and placed in an oven at 120° C. for about one hour. Upon removal from the oven and cooling, the laminated structure showed good adhesion of film to film and film to fiber fabric.

The improvement in physical properties is illustrated in the following table, where laminates of polyethylene film with polyethylene fiber fabrics are compared with a polyethylene film having about the same thickness as the film in the laminate.

| Sample | | 4 mil film | Ex. 1 | Ex. 2 | Ex. 3 | Ex. 4 |
|---|---|---|---|---|---|---|
| Tear resistance, lb. to tear (ASTM D1004-49T) | MD<br>TD | 1.2<br>1.6 | *2.2<br>*2.0 | *5.4<br>*5.8 | *12.2<br>*14.1 | *5.2<br>*6.0 |
| Tear resistance, g. to tear, (ASTM D689-42T) | MD<br>TD | 411<br>613 | 723<br>1,059 | 2,323<br>2,726 | 3,056<br>3,200 | No tear<br>No tear |
| Tensile strength, lb. to break (ASTM D412-41) | MD<br>TD | 7.6<br>7.2 | 16.8<br>9.8 | 87.3<br>28.8 | 138<br>122 | 137<br>126 |
| Elongation, percent (ASTM D412-41) | MD<br>TD | 465<br>655 | Less than 50<br>Less than 50 | | | |
| Shrinkage, percent at 120°C. for 5 min. in a glycerine bath | MD<br>TD | −60.2<br>+20.3 | −48.9<br>−8.6 | −19.2<br>−11.0 | −19.2<br>−11.8 | −21.0<br>−10.0 |

(1) *Film tore only with the fibers pulling out of the film ply.
(2) The minus sign in the shrinkage data indicates that the sample decreased in size; a plus sign indicates an expansion of the sample. Shrinkage tests were run on samples one inch wide by 12 inches long.
(3) MD indicates that the measurement was made on a sample cut along the machine direction of the laminate; TD indicates transverse direction.

What is claimed is:
1. A multi-ply, self-supporting, moisture-resistant and substantially moisture-impervious polyolefin structure, comprising at least one ply of a polyethylene film of a thickness of from about 1 to about 20 mils wherein the polyethylene thereof has a density of at least about 0.91 g./cc. at 23° C. and at least one ply of a fibrous polyalkylene fabric selected from the group consisting of polyethylene fibers having a density of at least about 0.93g./cc. at 23° C. and a melt index of from about 0.5 to about 20 dgm./min. and polypropylene fibers having a density of at least 0.91 g./cc. at 23° C. wherein said fabric has a weight of from about 0.05 to about 20 ounces per square yard, said plies being in alternating order and adhering to each other, and said polyolefin structure having a simul- taneous biaxial shrinkage of at least about 7.5 percent in one direction and of at least twice said shrinkage in the other direction when heated in a liquid bath at a temperature of about 120° C.

2. A two-ply polyolefin structure as claimed in claim 1 consisting of a single ply of said polyethylene film and a single ply of said fibrous polyalkylene fabric.

3. A three-ply polyolefin structure as claimed in claim 1 consisting of a single ply of said polyethylene film having adhered to it on both sides thereof plies of said fibrous polyalkylene fabric.

4. A three-ply polyolefin structure as claimed in claim 1 consisting of a single ply of said fibrous polyalkylene fabric having adhered to it on both sides thereof plies of said polyethylene film.

References Cited in the file of this patent

UNITED STATES PATENTS

| | | |
|---|---|---|
| 2,561,063 | McBurney et al. | July 17, 1951 |
| 2,598,090 | Yung et al. | May 27, 1952 |
| 2,714,571 | Irion et al. | Aug. 2, 1955 |
| 2,734,289 | Heaton et al. | Feb. 14, 1956 |
| 2,758,045 | Heaton et al. | Aug. 7, 1956 |
| 2,851,389 | Lappala | Sept. 9, 1958 |
| 2,932,323 | Aries | Apr. 12, 1960 |

FOREIGN PATENTS

| | | |
|---|---|---|
| 491,804 | Great Britain | Sept. 8, 1938 |
| 641,568 | Great Britain | Aug. 16, 1950 |
| 726,949 | Great Britain | Mar. 23, 1955 |

CERTIFICATE OF CORRECTION

Patent No. 3,058,863 October 16, 1962

Robert W. Gaines et al.

It is hereby certified that error appears in the above numbered patent requiring correction and that the said Letters Patent should read as corrected below.

Column 1, line 54, for "posses" read -- possess --; column 2, line 23, for "D-17-27" read -- D-71-27 --; line 45, for "fibre" read -- fiber --; column 4, line 34, for "on", second occurrence, read -- and --; column 5, line 13, for "perssure" read -- pressure --; line 25, for "deliminated" read -- delaminated --; column 6, in the table, fourth column, line 1 thereof, for "5.4" read -- 5.0 --; same table, fourth column, line 4 thereof, for "2,726" read -- 2,762 --; same table, fourth column, line 9 thereof, for "—19.2" read -- —18.2 --; same table, fifth column, line 9 thereof, for "—19.2" read -- —19.4 --.

Signed and sealed this 26th day of March 1963.

(SEAL)
Attest:

ESTON G. JOHNSON
Attesting Officer

DAVID L. LADD
Commissioner of Patents